United States Patent [19]
Szydlowski et al.

[11] Patent Number: 6,045,772
[45] Date of Patent: Apr. 4, 2000

[54] METHOD AND APPARATUS FOR INJECTING A LIQUID HYDROCARBON FUEL INTO A FUEL CELL POWER PLANT REFORMER

[75] Inventors: Donald F. Szydlowski, Ellington; Richard A. Sederquist, Newington, both of Conn.

[73] Assignee: International Fuel Cells, LLC, So. Windsor, Conn.

[21] Appl. No.: 09/136,709

[22] Filed: Aug. 19, 1998

[51] Int. Cl.[7] .............................. H01M 8/06; C01B 3/26; B01J 8/02

[52] U.S. Cl. .......................... 423/652; 422/211; 422/220; 429/19

[58] Field of Search .............................. 423/652; 422/211, 422/220; 429/17, 19

[56] References Cited

U.S. PATENT DOCUMENTS

| | | | |
|---|---|---|---|
| 3,505,018 | 4/1970 | Bawa et al. ......................... | 422/211 X |
| 4,522,894 | 6/1985 | Hwang et al. .............................. | 429/17 |
| 4,902,586 | 2/1990 | Wertheim ................................ | 429/17 X |
| 4,994,331 | 2/1991 | Cohen ................................... | 423/652 X |
| 5,432,020 | 7/1995 | Fleck ..................................... | 429/19 X |
| 5,741,474 | 4/1998 | Isomura et al. ...................... | 423/652 X |

*Primary Examiner*—Stephen Kalafut
*Attorney, Agent, or Firm*—William W. Jones

[57] ABSTRACT

A fuel atomizer for a liquid hydrocarbon fuel reformer/processor creates a high velocity atomized stream of a liquid fuel and steam, wherein the liquid fuel is quickly vaporized so as to limit carbon deposition from the fuel on the fuel vaporizer surfaces. The injector includes a small diameter fuel injection tube through which the liquid fuel and steam mixture is ejected at relatively high velocities. The liquid fuel forms an annular film which surrounds a steam core in the tube, which liquid droplet film and steam core composite are ejected from the tube into a stream of super heated steam, or steam and air. The stream of super heated steam substantially instantaneously vaporizes the fuel droplets from the film after the latter leaves the injection tube.

16 Claims, 2 Drawing Sheets

METHOD AND APPARATUS FOR INJECTING A LIQUID HYDROCARBON FUEL INTO A FUEL CELL POWER PLANT REFORMER

TECHNICAL FIELD

The present invention relates to a system for reforming a raw liquid hydrocarbon fuel, and in a preferred embodiment, to a liquid fuel injector assembly for an autothermal fuel reformer which is operable to limit or eliminate carbon deposition from the vaporization of liquid fuel as the latter passes into the vaporizer before entering the reformer.

BACKGROUND OF THE INVENTION

Autothermal hydrocarbon fuel reformers are known for the purpose of converting a raw hydrocarbon fuel to a hydrogen-enriched fuel which, with some additional cleanup, is suitable for use as a fuel gas for a fuel cell power plant. Typically, autothermal reformers are employed instead of conventional thermal steam reformers when heavier hydrocarbons are to be processed. Feed stocks such as gasoline or the like are better suited to be reformed by an autothermal reformer. The autothermal reformer is supplied with a mixture of air, steam and the raw fuel, and will catalytically convert this mixture to a hydrogen-rich processed fuel gas. In theory, most hydrocarbon feed stocks can be reformed to a hydrogen-enriched fuel cell reactant fuel by passing the air, steam and raw fuel over a catalyst bed in the reformer, wherein the following typical reaction takes place:

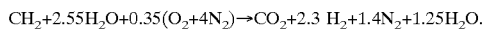

$$CH_2 + 2.55H_2O + 0.35(O_2 + 4N_2) \rightarrow CO_2 + 2.3\ H_2 + 1.4N_2 + 1.25H_2O.$$

In operation, however, a number of factors can inhibit the ability of the reformer to perform its desired function. The reformer catalyst can be poisoned by constituents in the liquid raw fuel, particularly sulfur. In addition, carbon deposits can form in the vaporizer when the liquid raw fuel gas comes into contact with hot vaporizer surfaces before it vaporizes, thus fouling the vaporizer. Such carbon deposits would block vaporizer passages into the reformer, thus rendering the vaporizer unusable. The problem of carbon deposition in the vaporizer is particularly exacerbated when the raw fuel being processed is a liquid fuel, such as gasoline, fuel oil, kerosene, naphtha, diesel fuel, or the like.

In certain applications, such as in mobile fuel cell-powered applications, it would be desirable to be able to utilize liquid raw fuels such as gasoline, diesel fuel, or the like, which are commonly available at gas stations, as the process fuel which is to be reformed for use in a fuel cell power plant. In this way, a mobile vehicle such as an automobile, truck, bus, or the like could be electrically powered by electricity produced by an on board fuel cell power plant which employs such a liquid fuel as its hydrogen source. In order to obtain such a result, however, one would have to deal with, among other things, the problem of carbon deposition from the liquid fuel in the vaporizer.

DISCLOSURE OF THE INVENTION

This invention relates to a liquid fuel atomizer which creates very fine droplets. These droplets can then easily be vaporized by a hot gas stream in a distance of only a few inches after exiting the atomizer. This is a desirable attribute of the invention since it keeps the fuel droplets from contacting the hot metal surfaces of the vaporizer, thus preventing carbon formation in the vaporizer and the vaporizer plugging which would result.

The proposed fuel atomizer comprises a small tube into which the liquid fuel is introduced along with an atomizing vapor stream such as steam. It is desirable to have the atomizing vapor stream velocity in the one hundred to five hundred ft/sec range. The fuel-steam stream is injected into the mixing chamber through a small bore tube at sufficiently high velocities so as to create an annular stream of th(e liquid fuel within the atomizer tube which surrounds a core of steam. The thickness of the annular fuel stream is a function of the fuel velocity-to-steam velocity ratio, and the ratio of fuel to steam in the fuel-steam mixture. The liquid fuel forms a thin annular film adjacent to the inside wall of the tube from which the atomized fuel droplets are formed by the extremely high shearing forces created by the atomizing vapor stream. The resultant droplets are quite small, and have a mean droplet diameter of less than ten microns. This composite stream is injected into an outer annular mixture of super heated steam, the temperature of which is about 1,000° F., or hot steam and air, which essentially instantaneously vaporizes the liquid fuel droplets exiting from the atomizer tube. For example, the liquid fuel component of the fuel-steam mixture can be vaporized by the hot steam within one inch to three inches after leaving the atomizer tube. By essentially instantaneously vaporizing the liquid fuel, deposition of carbon from the liquid fuel on components of the reformer can be minimized.

The aforesaid fuel atomizer system was used in conjunction with an autothermal reformer test rig to evaluate the reformer in a three hundred hour test run. The atomizer was used to process the jet fuel JP8 at a flow rate of 8.8 pounds per hour (pph). The atomizer was able to produce a fine droplet stream when the fuel was injected into a high velocity saturated steam core which had a flow rate of 2.2 pph. The atomizer was coupled to a vaporizer section in the test rig which completely vaporized fuel droplets using super heated steam at a flow rate of 30.0 pph at 900° F. After three hundred hours of testing, a post test inspection of the vaporizer showed no trace of carbon particles inside of the vaporizer.

This invention thus relates to a method and apparatus for limiting carbon formation in a vaporizer section leading to a reformer, preferably an autothermal reformer, which is used to process a liquid fuel such as gasoline, or the like.

It is therefore an object of this invention to provide a method and apparatus for injecting a liquid fuel into a fuel vaporizer which results in minimal carbon deposition in the vaporizer.

It is a further object of this invention to provide a method and apparatus of the character described wherein the liquid fuel stock is essentially instantaneously vaporized upon entry into the vaporizer.

It is an additional object of this invention to provide a method and apparatus of the character described wherein a mixture of liquid fuel and steam is injected into the vaporizer in the form of a fuel-steam composite having atomized fuel droplets which have a mean diameter of less than about ten microns.

It is another object of this invention to provide a method and apparatus of the character described wherein the fuel-steam stream is entrained in a super heated steam-air stream which vaporizes the fuel component of the fuel-steam stream as the latter enters the vaporizer.

These and other objects and advantages of the invention will become more: readily apparent from the following detailed description thereof when taken in conjunction with the accompanying drawings in which:

SPECIFIC EMBODIMENTS FOR CARRYING OUT THE INVENTION

Figure 1:
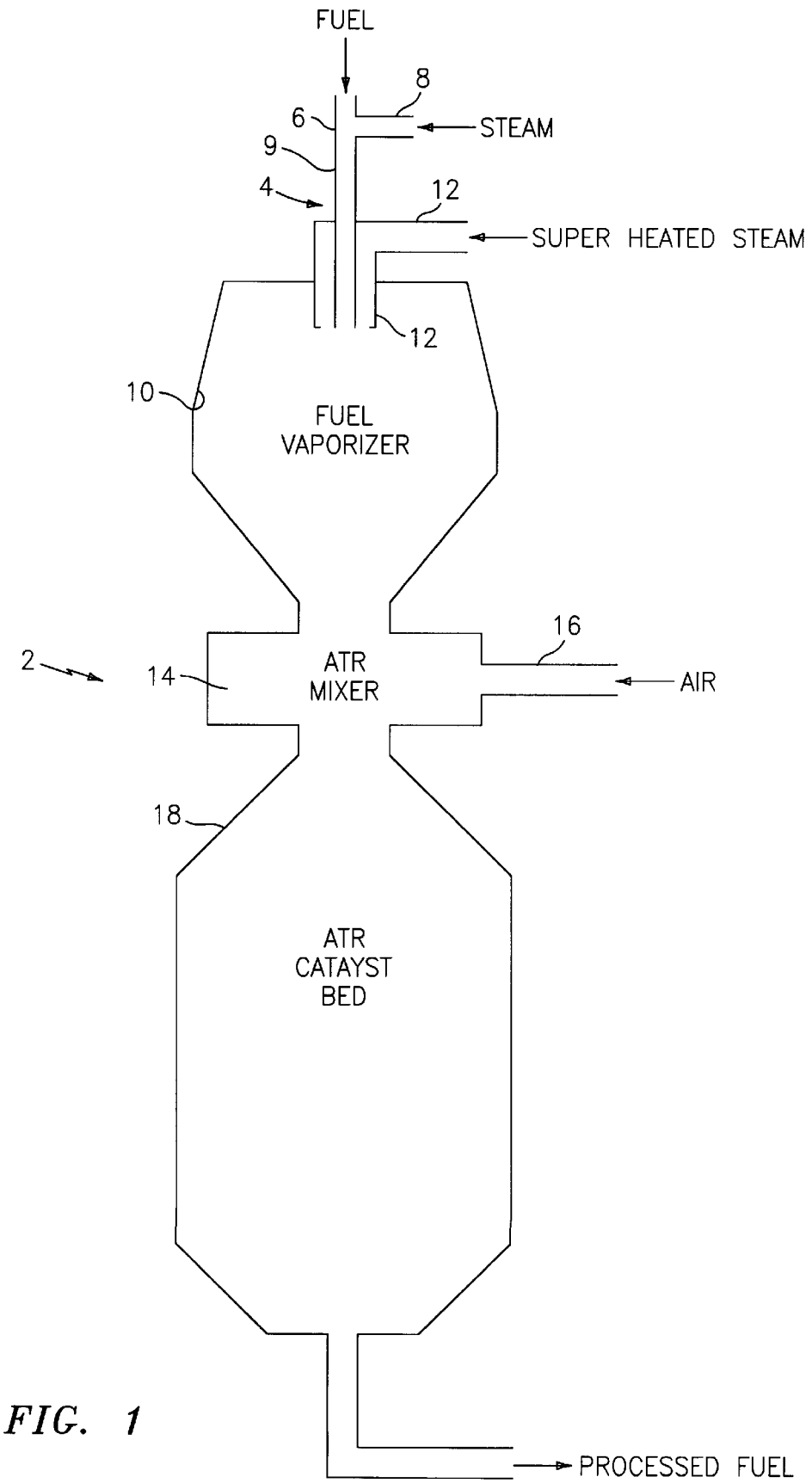
FIG. 1 is a schematic view of a liquid fuel autothermal reformer which employs the method and apparatus of this invention.

Referring now to the drawings, FIG. 1 is a schematic view of a liquid fuel atomizing/vaporizing and fuel processing system, which is denoted generally by the numeral 2, and which is suitable for use in a vehicle such as an automobile, and in fuel processing systems such as those disclosed in copending patent application U.S. Ser. 09/104,254, filed Jun. 24, 1998. The fuel being processed, as noted above, can be gasoline, diesel fuel, naphtha or the like liquid fuels. The system 2 includes a fuel atomizer section 4 in which a liquid fuel stream is atomized and converted to droplets having a size or diameter of less than about ten microns. The liquid fuel is injected into the atomizer section 4 via a fuel injection tube 6 and steam is, injected into the atomizer section 4 via a steam injection tube 8. The fuel and steam form a compound flow pattern in a tube section 9 wherein the steam fraction forms the core of the pattern, and the fuel forms an outer annulus in the pattern. A supply of super heated steam (about 1,000° F.) is injected into the fuel vaporizer chamber 10 through line 12. The steam from the line 12 is utilized to vaporize the atomized fuel droplets which are ejected from the tube 9. Fuel/steam vapor which exits the chamber 10 is admixed in a mixer chamber 14 with air which is injected into the chamber 1.4 via a line 16. The vaporized fuel-air mixture then enters a reformer 18, which is preferably an autothermal reformer (ATR), where the fuel is converted into a hydrogen enriched gas.

Figure 2:
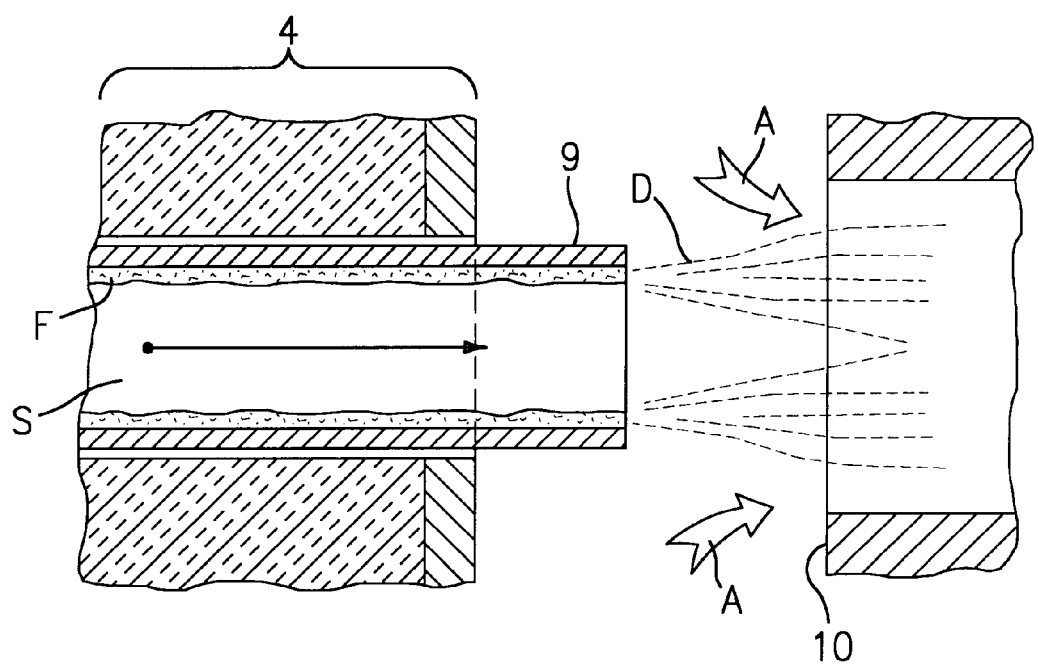
FIG. 2 is a somewhat schematic sectional view of an embodiment of a liquid fuel steam injector tube and steam atomizing assembly which is formed in accordance with this invention.

FIG. 2 shows details of one embodiment of the fuel-steam atomizer section 4 and the fuel vaporizer-mixing chamber portion 10 of the system 2 of FIG. 1. The atomizer tube 9 projects from the atomizer section 4 and is operable to produce a composite jet of steam S and a film of liquid fuel F, with the steam component S forming the core of the composite jet, and the fuel film component F forming an outer annulus of the composite jet. It is desirable to minimize the thickness of the fuel annulus F so that the liquid fuel droplets D leaving the end of the tube 9 can be quickly vaporized in the stream of super heated steam, the latter of which is denoted by the arrows A, after the droplets D leave the atomizer tube 9. This goal is accomplished by a proper combination of several atomizer parameters, namely, tube diameter, fuel/steam velocity ratio, steam temperature and pressure, and the liquid fuel density.

The velocity of the fuel film F and steam S in the atomizer tube 9 should preferably be kept in the range of about 50 to about 500 ft/sec. When warm (about 125° F.) liquid fuel and a small amount of saturated steam are fed through an atomizer tube 9 having a bore diameter of about 0.055 inch at the aforesaid high velocities, the fuel component F forms a film on the inner wall of the tube 9 in the fuel-steam stream, and the steam S forms the core of the fuel-steam stream, as seen in FIG. 2. The steam component S has a velocity of about 120 ft/sec which is typically twice that of the the fuel component F in the fuel-steam stream. When the fuel-steam stream is injected into the super heated steam stream A from the line 12, the super heated steam A almost instantaneously vaporizes the fuel component in the composite stream, in part due to the extremely small droplet size of the fuel droplets D.

With an atomizing heated steam stream velocity of 500 ft/sec, and about a three micron fuel film thickness, the fuel droplets D will vaporize in the super heated steam within about an inch of being ejected from the injection tube 9. Thus at the velocities specified above, the dwell time of the liquid fuel in the vaporizer 10 is only about 0.2 milliseconds. With such a short dwell time, there will be little or no interaction between the liquid fuel droplets D and components of the vaporizer 10. Therefore, the formation of carbon deposits resulting from the liquid fuel droplets D contacting components of the system 2 is greatly restricted or eliminated.

It will be appreciated that the method and apparatus of this invention enables the use of a greatly reduced liquid fuel vaporizer size. The invention also allows the mixing of a liquid fuel and steam composite stream with super heated steam which results in a vaporized fuel that is suitable for further mixing with an air supply. The vaporized fuel and air mixture is then fed into an autothermal reformer to process the atomized fuel and air mixture into a hydrogen rich fuel stream for a fuel cell power plant.

Since many changes and variations of the disclosed embodiment of the invention may be made without departing from the inventive concept, it is not intended to limit the invention otherwise than as required by the appended claims.

What is claimed is:

1. A fuel processing assembly for use in connection with a fuel cell power plant, said fuel processing assembly comprising:
   a) a fuel vaporizing chamber;
   b) a fuel atomizing section for directing a mixture of atomized fuel droplets and steam toward said fuel vaporizing chamber;
   c) a line for injecting a super heated vaporizing stream comprising steam into said fuel processing assembly, said line being located between said atomizing section and said vaporizing chamber whereby said super heated vaporizing stream can be injected into said mixture of fuel droplets and steam so as to vaporize said fuel droplets in said mixture of fuel droplets and steam; and
   d) a fuel reformer located downstream of said fuel vaporizing chamber for receiving vaporized fuel from said fuel vaporizing chamber.

2. The fuel processing assembly of claim 1 wherein said atomizing section is operable to produce a fuel-steam mixture wherein the atomized fuel droplets form from an annular film which surrounds a core of steam.

3. The fuel processing assembly of claim 2 wherein the fuel film moves at a velocity which is about one half of the velocity of the steam core.

4. The fuel processing assembly of claim 3 wherein said atomized fuel droplets have a mean diameter of less than about ten microns.

5. The fuel processing assembly of claim 4 wherein said super heated vaporizing stream is super heated steam or a mixture of super heated steam and air.

6. The fuel processing assembly of claim 5 wherein said super heated vaporizing stream is heated to a temperature of about 1,000° F.

7. The fuel processing assembly of claim 6 wherein said fuel reformer is an autothermal reformer.

8. A fuel processing assembly for use in connection with a fuel cell power plant, said fuel processing assembly comprising:

a) a fuel vaporizing chamber;

b) a fuel atomizing section leading to said fuel vaporizing chamber;

c) a first line for injecting a hydrocarbon fuel stream into said atomizing section;

d) a second line for injecting steam into said atomizing section, said second line being located downstream of said first line;

e) a third line for injecting super heated steam into said fuel processing assembly, said third line being located downstream of said second line and immediately upstream of said vaporizing chamber; and f) a fuel reformer located downstream of said vaporizing chamber for receiving vaporized fuel from said vaporizing chamber.

9. The fuel processing assembly of claim 8 further comprising an air injection line down stream of the vaporizer for mixing air with the vaporized fuel and feeding an autothermal reformer.

10. A method for processing a liquid hydrocarbon fuel so as to render the fuel suitable for use in powering a fuel cell power plant and also limit carbon deposition on fuel processing components, said method comprising the steps of:

a) providing a fuel vaporizing chamber;

b) forming and directing a mixture of atomized fuel droplets and steam toward said fuel vaporizing chamber;

c) injecting a super heated vaporizing stream comprising steam into said fuel processing assembly, said line being located between said atomizing section and said vaporizing chamber whereby said super heated vaporizing stream can be injected into said mixtures of fuel droplets and steam so as to vaporize said fuel droplets in said mixture of fuel droplets and steam; and d) providing a fuel reformer located downstream of said fuel vaporizing chamber for receiving vaporized fuel from said fuel vaporizing chamber.

11. The method of claim 10 wherein said atomizing section produces a fuel-steam mixture wherein the atomized fuel forms an annular film which surrounds a core of steam.

12. The method of claim 11 wherein the atomized fuel film moves at a velocity which is about one half of the velocity of the steam core.

13. The method of claim 12 wherein said atomized fuel droplets have a mean diameter of less than about ten microns.

14. The method of claim 13 wherein said super heated vaporizing stream is super heated steam or a mixture of super heated steam and air.

15. The method of claim 14 wherein said super heated vaporizing stream is heated to a temperature of about 1,000° F.

16. The methhod of claim 15 wherein said fuel reformer is an autothermal reformer.

* * * * *